United States Patent [19]

Hughes

[11] 4,024,060

[45] May 17, 1977

[54] SEWAGE CLARIFIER SYSTEM

[76] Inventor: Charles Durant Hughes, 1045 4th St. North, Brandon, Manitoba, Canada, R7A 3J2

[22] Filed: Apr. 12, 1976

[21] Appl. No.: 675,917

Related U.S. Application Data

[63] Continuation-in-part of Ser. No. 508,251, Sept. 23, 1974, abandoned.

[52] U.S. Cl. .............................. 210/197; 137/209; 210/83; 210/532 S; 210/533
[51] Int. Cl.² ........................................ B01D 21/24
[58] Field of Search ................ 61/2; 137/138, 139, 137/206, 209, 247.11, 247.41; 210/83, 142, 151, 197, 528, 532 S, 533, 536

[56] References Cited

UNITED STATES PATENTS

| 252,344 | 1/1882 | Williams | 137/139 X |
| 796,672 | 8/1905 | Priestman | 137/209 |
| 899,750 | 9/1908 | Miller | 137/139 X |
| 904,141 | 11/1908 | Miller | 137/139 X |
| 1,063,595 | 6/1913 | Rein | 137/209 X |
| 3,494,462 | 2/1970 | Baud | 210/528 X |

Primary Examiner—Frank A. Spear, Jr.
Assistant Examiner—R. G. Mukai
Attorney, Agent, or Firm—Stanley G. Ade

[57] ABSTRACT

Effluent flows into a settling pipe channel or conduit and is prevented from discharge while the solids are settling, by means of airlocks. When the solids have settled, one airlock is opened and the clarified effluent is drawn off and replaced by unclarified effluent at which time the one airlock is closed. When the pipe or the like requires cleaning of solids, the other airlock is opened and untreated effluent is used to scour out the pipe or channel and return the solids to the main settling pond to assist in aerobic action. A plurality of pipes or the like can be automatically sequenced so that continuous clarification and purging is carried out.

10 Claims, 3 Drawing Figures

SEWAGE CLARIFIER SYSTEM

BACKGROUND OF THE INVENTION

This invention relates to new and useful improvements in tube clarifiers used with sewage effluent treatment plants and constitutes a continuation-in-part application of Ser. No. 508,251, filed Sept. 23, 1974 and now abandoned.

The general principle upon which a tube clarifier operates is that the retention time in any clarifier is determined by the distance a particle has to settle and the rate of settling. To minimize the distance a particle has to settle, the liquid is passed through horizontal tubes or shallow channels at a slow rate and the dimension of tubes and rate of flow is dependent upon the characteristics of the effluent to be treated.

This principle has had various applications including short inclined tubes where deposited material moves down the tube by gravity and the clarified effluent moves up the tube. Also, horizontal tubes have been used where backwashing is by reversed flow of clarified effluent which removes the deposited material.

All devices presently used for clarifying liquids suffer from several disadvantages. The devices using mechanical means for the removal of deposited material have such mechanisms in contact with foreign matter which causes certain mechanical difficulties and the distance a particle has to settle is far greater than in a tube settler.

Existing tube settling devices either rely on gravity to clean the tubes of material or reqire a large volume of previously clarified liquid to scour the tubes.

All existing clarifiers used one or the other mechanisms to collect the deposited material and a separate mechanism to return a large percentage of this material to the treatment pond in the case of sewage treatment.

SUMMARY OF THE INVENTION

The present invention overcomes these disadvantages and allows the advantages of shallow settling basins to be gained without undue complications.

The present invention utilizes a system of airlocks for control thus eliminating all mechanical gating and valves in contact with the effluent.

Furthermore, untreated effluent is used to scour out the settling conduits so that the solids and the untreated effluent will be returned to the treatment pond to assist and materially increase aerobic action in the treatment pond.

The principal object and essence of the invention is to provide an apparatus of the character herewithin described which eliminates all mechanical valving and gating in contact with the effluent.

Another object of the invention is to provide a device of the character herewithin described in which the loss of hydraulic head through the system will be minimal.

Yet another object of the invention is to provide an apparatus of the character herewithin described in which the scoured solids are returned to the treatment pond.

Still another object of the invention is to provide an apparatus of the character herewithin described which is particularly suited for automatic operation inasmuch as a plurality of settling conduits may be utilized, each having its own control device so that they can be sequenced for settling, removal of clarified effluent and scouring so that a continuous flow is maintained.

Yet another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
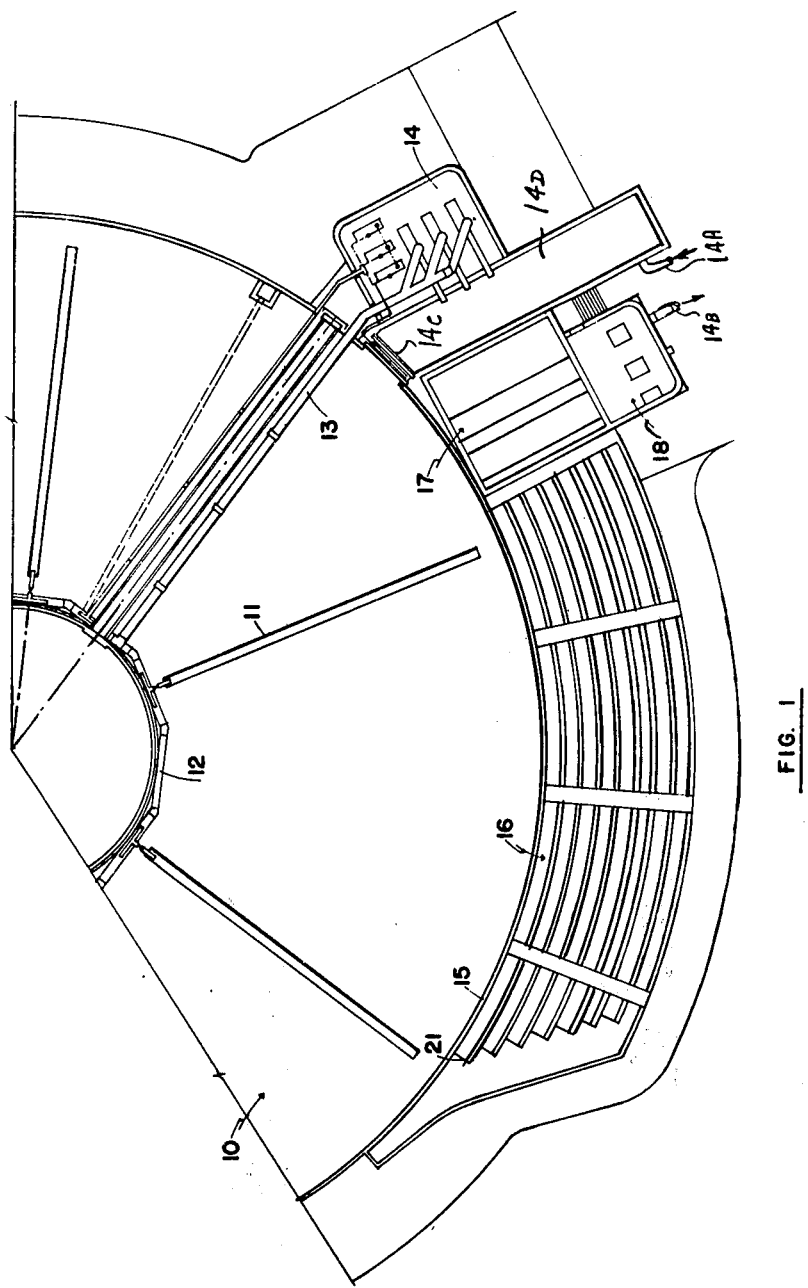
FIG. 1 is a fragmentary partially schematic plan view of part of a sewage treatment system with the invention incorporated therein.

Referring first to FIG. 1, reference character 10 illustrates a portion of the main treatment pond which operates conventionally and includes a plurality of liquid and air headers 11 extending from a common annulus 12 which in turn is supplied by main conduit 13 extending from the pump house generally designated 14. An influent line 14A supplies sewage into a trough 14D, a clarified effluent line 14B discharges the end product and a low lift large volume air lift pump 14C are also illustrated.

Situated adjacent one side wall 15 of the pond or lagoon is a plurality of arcuately curved clarifiers generally designated 16 which extend to a clarifier building generally designated 17 having an attached clarified liquid pump house and sump generally designated 18. The alignment of the clarifier is to suit the treatment pond and can be varied.

In the specification and claims, the individual clarifiers are defined as conduits and this is intended to cover shallow channels, tubes or the like.

Figure 2:
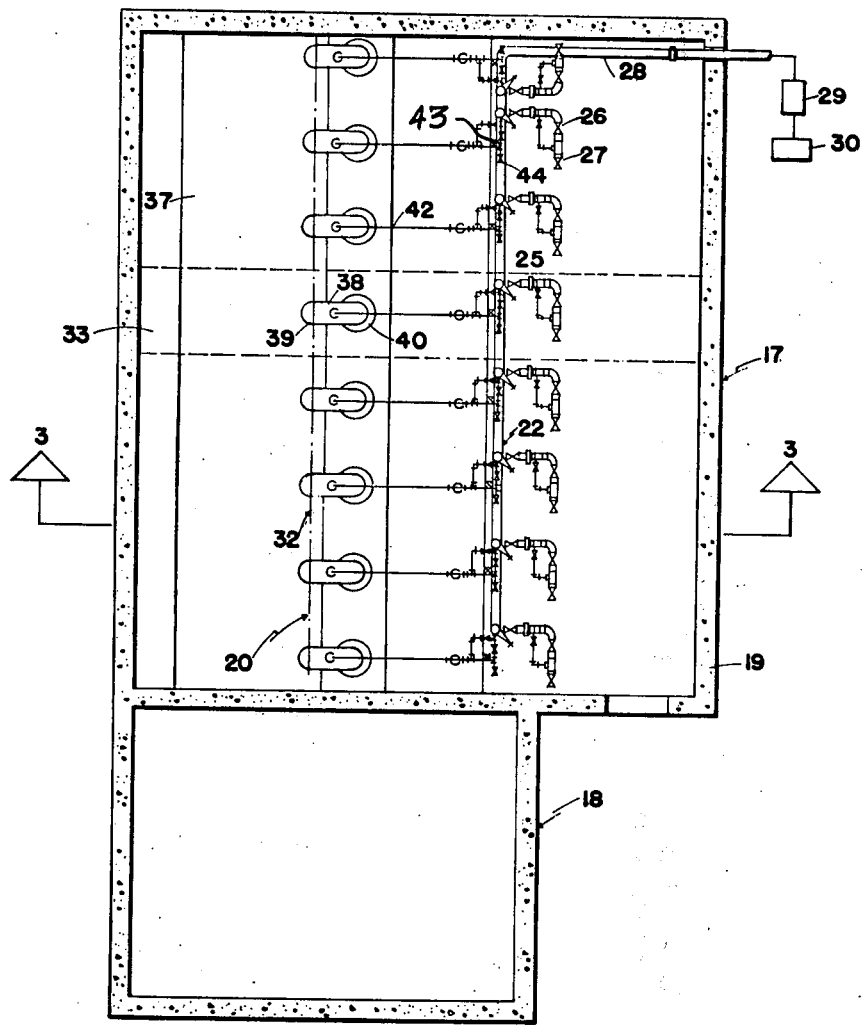
FIG. 2 is a top plan view of the clarifier building portion of the invention.
Figure 3:
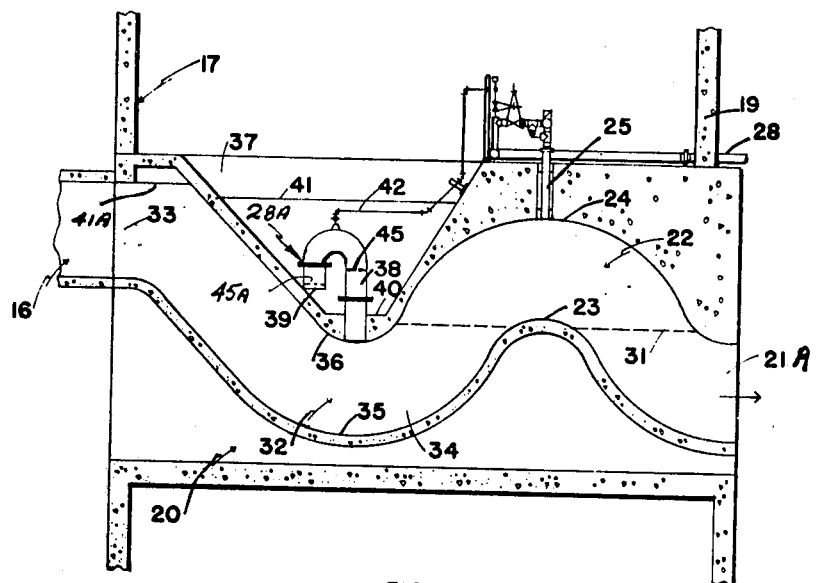
FIG. 3 is a section substantially along the line 3—3 of FIG. 2.

Referring to FIGS. 2 and 3, the clarifying building includes the enclosing wall 19 with the individual clarifier conduits 16 extending into the enclosure and each terminating in airlock control structure collectively designated 20, situated at the discharge ends 33 of the conduits 16.

Means are provided (not illustrated) to supply effluent from the main pond 10 to each of the clarifying settling conduits 16 adjacent the intake ends 21 thereof and this method of supply is preferably by hydraulic head due to the difference in elevation of the settling conduits and the main pond.

The discharge end or outlet 21A of the airlock control structure 20 communicates back to the main pond via the trough 14D and the pump 14C and the outlet is normally closed off by a first or main airlock assembly collectively designated 22.

This consists of a reverse U-shaped enclosure or chamber having a lower wall portion 23 forming a dam and an upper wall portion or hump 24 having a compressed air conduit 25 extending therethrough and into the enclosure.

This compressed air conduit is controlled by valves 26 and 27, valve 27 exhausting to atmosphere and valve 26 controlling compressed air through a main conduit 28 from pump 29 operated by source of power 30, both of which are shown schematically in FIG. 2.

It will also be observed that the elevation of the main airlock assembly 22 is below the elevation of the settling conduit 16 so that as compressed air is introduced through the valve 26 to the airlock assembly 22, the level of the liquid will lower until it reaches the level indicated by dotted line 31 slightly below dam 23 thus preventing any flow of liquid through the discharge end or outlet 21A of the airlock control structure 20.

A second part of the airlock assembly collectively designated 32 is provided between the discharge end 33 of the settling conduit 16 and the main airlock assembly 22 and this includes a U-shaped cross section chamber 34 having a lower curved wall 35 and an upper curved wall constituting a dam 36 and it will be observed that dam 23 is higher in elevation than dam 36. This U-shaped chamber ensures retaining the air in the airlock 22 and still allows adequate hydraulic capacity for flushing.

This means that by controlling the level at the line 31, the main or first airlock 23 operates to prevent any discharge of liquid through the end 21A unless desired for flushing. In this regard the connection between the outlet or conduit 21A and the trough 14D is such that back pressure in this outlet 21A is always maintained as the low lift large volume air lift pump 14C is designed to only create a scouring velocity in one of the conduits 16 and will not depress the liquid level in conduit 21A to an elevation where there is not sufficient back pressure to maintain the air in the airlock 22 as long as this airlock is being maintained by compressed air through 25.

Situated above the wall constituting dam 36 is a transversely extending ditch 37 for the discharge of clarified effluent from the settling tubes 16 which, of course, lie side by side within the clarifier building and a U-shaped discharge tube 38 extends upwardly from the area 32 through the dam 36 and termdinates as illustrated at 39, adjacent the base 40 of the ditch so that this end is always under the water level which is indicated by reference character 41. Alternatively, this end 39 may discharge into a transversely extending discharge tube (not illustrated).

A compressed air conduit 42 enters the discharge tube 38 at the apex thereof and compressed air and release of compressed air is controlled by valves 43 and 44 which in turn control compressed air from the main feed conduits 28. Valve 44 exhausts to atmosphere and valve 43 controls the entry of compressed air from the main conduit 28 through conduit 42.

When compressed air is fed through conduit 42, an airlock is formed in the upper part of the discharge tube 38 with the water level within the tube being indicated by reference characters 45 and 45A so that no effluent can discharge through this tube 38 to the ditch 37. This structure forms a second airlock assembly generally designated 38A.

In operation, the airlock at 22 is installed by feeding compressed air through the conduit 25 and the airlock is installed within the discharge tube 38 by feeding compressed air through the conduit 42.

The pressure at 32 will be greater than the pressure at 39. The difference is exactly equal to the difference in liquid level 41 in ditch 37 and liquid elevation 41A in conduit 16. The air pocket between lines 45 and 45A and the air/water face elevation on either side of the dam will vary exactly the same amount as the difference in elevation of the water elevation in conduit 16 and ditch 37.

Assuming the airlock is filled to capacity, when required by operating condition, the water/air interface lines will be as shown in FIG. 3 by reference characters 45 and 45A.

Liquid pressure in open vessels being directly proportional to depth, the pressure at 39 will be exactly the depth of the air/liquid interface below liquid elevation in channel 37, say depth H. The air/liquid pressure on the other side of the device will be practically identical due to the low density of air. Therefore, the liquid/air interface opposite 38 must be depth H below the liquid level in conduit 16. Providing that the design allows that the difference in liquid elevation between conduit 16 and channel 37 is less than the height from 39 to the bottom of the inverted U, the device will stop discharge when filled with air.

Effluent is allowed to flow into the settling conduit 16 of this particular clarifier until the conduit is full whereupon flow ceases and a certain period is allowed for settling solids to the base of the settling conduit 16.

When the necessary time has elapsed, which, of course, depends upon the water depth in the conduit and the type of effluent being treated, valve 44 is released and valve 43 is closed thus venting the airlock within the discharge tube 38 and allowing the hydraulic head 41A within the settling tube 16 to discharge the clarified effluent in the reverse siphon action through the discharge tube 38 and into the ditch 37.

At the same time, this clarified effluent will be replaced by unclarified effluent entering the settling conduit by the intake end 21 thereof, the rate of entry being controlled by the size of discharge tube 38, and the length and depth of settling conduit 16 determining the degree of clarification.

This continuous sequence continues until the buildup of solids within the base of the settling conduit 16 is sufficient to require purging at which time the airlock is replaced within the discharge tube 38 and the main airlock 22 is released by closing valve 26 and opening valve 27 thus venting the air to atmosphere.

At this time an airlift pump or other means of high volume low lift pump (not illustrated) will be utilized to pump unclarified effluent through the settling conduit 16 from intake end 21, through the area 32 and airlock 22 and out of the discharge end 21A of the airlock control structure. This effluent is passed through the system at scouring velocity thus cleaning out the settling solids and conveying same together with the unclarified effluent being utilized for this scouring process, back to the main pond where the solids can assist in the aerobic or other action within the main treatment pond.

In this connection, the pump 14C lowers the level of effluent in the trough 14D slightly, but not sufficiently to release the main airlocks of the clarifying tubes although some compressed air release may occur.

Due to the fact that the main airlock has been released in the tube being purged, the hydraulic head or other means between the pond and the intake end 21 of this particular clarifier tube, causes a flow of unclarified effluent through the tube at a scouring velocity equal to the amount of effluent being pumped by pump 14C, from the trough 14D back into the pond.

As soon as the scouring action has removed the solids, the pump 14C ceases pumping and the main airlock is replaced at the airlock 22 so that the clarifying sequence recommences. It will be observed that FIG. 2 shows a plurality of side by side settling conduits 16 together with accompanying control airlocks and valves so that it will be appreciated that the entire operation can be made automatic by the provision of conventonal solenoid valves, timers and the like.

It is desirable that the clarifiers be sequenced so that there is always a flow of clarified effluent into the ditch 37 and as there are no mechanical parts or valves in contact with the effluent, maintenance will be negligible.

Finally, summarizing the operation of an individual unit, and presuming that the settling channel 16 is filled with unclarified liquids, and with airlocks established in discharge tube 38 and at 22, no flow will take place for the calculated time that is required for the particles to settle to the bottom of the settling conduit.

Discharge of clarified liquid (due to hydraulic head) will commence by releasing the airlock within the discharge tube 38 and this discharged effluent will be replaced by unclarified liquid entering the settling conduit by the intake end 21 on a continuous basis, until such time as the accumulation of deposited solids becomes too great. This period will be controlled by time clocks (not illustrated) to suit each situation.

When flushing is required, discharge of clarified liquid will be stopped by the installation of the airlock within the discharge tube 38 and the main airlock at 22 will be released whereupon unclarified liquid will be passed through the clarifier at a scouring velocity returning the settled material to the treatment facility or pond by the action of pump 14C as hereinbefore described.

As mentioned previously, the control of the various steps will be by valves 26 and 27 and valves 43 and 44 and it should be stressed that clarification is a continuous process until the tubes become overloaded with sediment.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tube clarifier for the treatment of sewage effluent and the like in conjunction with a main pond and a source of compressed air; comprising in combination at least one settling conduit communicating at one end thereof to said pond and including a discharge end at the other end thereof, an air lock structure connected by one end thereof to said discharge end of said conduit, said airlock structure including a U-tube chamber connected by one end thereof to said discharge end of said conduit and an inverted U tube chamber connected by one end thereof in series with said U tube chamber, said inverted U tube chamber constituting a main airlock assembly, valve means connecting said source of compressed air with the hump of said inverted U-tube chamber to establish and release an airlock in said chamber, means operatively connected to the other end of said inverted U-tube chamber for establishing back pressure at said other end of said inverted U-tube chamber, when said airlock is established in said inverted U-tube chamber, and releasing said back pressure when said airlock is released in said inverted U-tube chamber, a discharge tube connected to and communicating with said U-tube chamber at the upper side of the base of said U-tube chamber, a second airlock assembly in said discharge tube and valve means connecting said source of compressed air with said second airlock assembly for establishing and releasing an airlock in said second airlock assembly.

2. The clarifier according to claim 1 in which the upper wall of said U-tube chamber is lower than the lower wall of said inverted U-tube chamber.

3. The clarifier according to claim 2 in which said discharge tube comprises an inverted U-tube having an intake end and discharge end, said intake end being connected to said U-tube chamber, said discharge end being higher than said intake end.

4. The clarifier according to claim 3 which includes means connecting the other end of said inverted U tube chamber with said pond whereby when said main airlock assembly is released and said second airlock assembly is actuated to establish an airlock therein, effluent flows through said settling conduit, through said airlock structure and back to said pond thereby flushing solids from settling conduit.

5. The clarifier according to claim 2 which includes means connecting the other end of said inverted U tube chamber with said pond whereby when said main airlock assembly is released and said second airlock assembly is actuated to establish an airlock therein, effluent flows through said settling conduit through said airlock structure and back to said pond thereby flushing solids from said settling conduit.

6. The clarifier according to claim 1 in which said discharge tube comprises an inverted U-tube having an intake end and discharge end, said intake end being connected to said U-tube chamber, said discharge end being higher than said intake end.

7. The clarifier according to claim 6 which includes means connecting the other end of said inverted U-tube chamber with said pond whereby when said main airlock assembly is released and said second airlock assembly is actuated to establish an airlock therein, effluent flows through said settling conduit, through said airlock structure and back to said pond thereby flushing solids from said settling conduit.

8. The clarifier according to claim 1 which includes means connecting the other end of said inverted U-tube chamber with said pond whereby when said main airlock assembly is released and said second airlock assembly is actuated to establish an airlock therein, effluent flows through said settling conduit, through said airlock structure and back to said pond thereby flushing solids from said settling conduit.

9. In a tube clarifier for the treatment of sewage effluent and the like in conjunction with a main pond and a source of compressed air; at least one settling conduit communicating at one end thereof with said pond, an air lock structure connected to the other end of said settling conduit, said airlock structure including a first conduit portion and a second conduit portion connected thereto, said first conduit portion being formed in a reverse U-shaped configuration having a discharge end, thus constituting a dam at the apex of the lower side of said reverse U-shaped configuration, said second conduit portion being formed in a U-shaped configuration and connected to said settling conduit and communicating in series with said first conduit portion, said U-shaped configuration thus consituting a dam at the upper side of said U-shaped configuration, the elevation of said first mentioned dam being higher than the elevation of said second mentioned dam and a discharge tube connected adjacent the upper side of said second mentioned dam, said first conduit portion constituting a main airlock assembly, valve means connecting said source of compressed air with said main airlock assembly for establishing and releasing an airlock in said main airlock assembly, means operatively connected to said discharge end of said first conduit portion for establishing back pressure at said discharge end when said airlock is established in said main airlock assembly and releasing said back pressure when said airlock is released in said main airlock assembly, and a further airlock assembly in said discharge tube, said discharge tube comprising a reverse U-shaped tube extending from adjacent the upper side of said second conduit portion.

10. The clarifier according to claim 9 which includes means connecting the discharge end of said first conduit portion with said pond whereby when said secondary airlock assembly is actuated to establish an airlock therein, effluent flows through said settling conduit, through said airlock structure and back to said main pond thereby flushing solids from said settling conduit.

* * * * *